US012373737B2

United States Patent
Cheng et al.

(10) Patent No.: US 12,373,737 B2
(45) Date of Patent: Jul. 29, 2025

(54) MODEL GRADIENT UPDATE METHOD AND DEVICE

(71) Applicant: CHINA UNIONPAY CO., LTD., Shanghai (CN)

(72) Inventors: Dong Cheng, Shanghai (CN); Xin Cheng, Shanghai (CN); Yongkai Zhou, Shanghai (CN); Pengfei Gao, Shanghai (CN); Tiecheng Jiang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/690,017

(22) PCT Filed: Aug. 15, 2022

(86) PCT No.: PCT/CN2022/112615
§ 371 (c)(1),
(2) Date: Mar. 7, 2024

(87) PCT Pub. No.: WO2023/142439
PCT Pub. Date: Aug. 3, 2023

(65) Prior Publication Data
US 2024/0378507 A1 Nov. 14, 2024

(30) Foreign Application Priority Data

Jan. 28, 2022 (CN) .......................... 202210107380.3

(51) Int. Cl.
*G06N 20/00* (2019.01)
(52) U.S. Cl.
CPC .................................... *G06N 20/00* (2019.01)
(58) Field of Classification Search
CPC .................................................... G06N 20/00
(Continued)

(56) References Cited

U.S. PATENT DOCUMENTS

2019/0114569 A1* 4/2019 Palmer ............. G06Q 10/06316
2019/0340509 A1* 11/2019 Osindero ................. G06N 3/04
(Continued)

FOREIGN PATENT DOCUMENTS

CN 112087518 A 12/2020
CN 112818394 A 5/2021
(Continued)

OTHER PUBLICATIONS

International Search Report and Written Opinion for PCT Appl. No. PCT/CN2022/112615, mailed on Oct. 13, 2022.
(Continued)

*Primary Examiner* — Omar F Fernandez Rivas
*Assistant Examiner* — Em N Trieu
(74) *Attorney, Agent, or Firm* — Foley & Lardner LLP

(57) ABSTRACT

The present application provides a model gradient update method and device, for use in improving the accuracy of model training. A central server repeatedly executes a gradient update process until a stop condition is satisfied. One gradient update process comprises: receiving first gradients respectively sent by multiple nodes, the first gradients being obtained by each node using sample data to train a model to be trained of the node one or more times; obtaining a second gradient one the basis of the multiple first gradients and the probability of each node in the present gradient update process, the probability of each node in the present gradient update process being determined by an Actor-Critic network one the basis of the probability of each node in the last gradient update process; and sending the second gradient to the multiple nodes, respectively.

8 Claims, 3 Drawing Sheets

(58) Field of Classification Search
USPC .......................................................... 706/12
See application file for complete search history.

(56) References Cited

U.S. PATENT DOCUMENTS

| | | | |
|---|---|---|---|
| 2019/0354867 A1* | 11/2019 | Czarnecki | G06N 3/006 |
| 2019/0385022 A1* | 12/2019 | Jang | B25J 9/1697 |
| 2021/0125032 A1 | 4/2021 | Zhou | |
| 2022/0101130 A1* | 3/2022 | Taherzadeh Boroujeni | G06N 3/08 |
| 2023/0179630 A1* | 6/2023 | Kundu | H04L 63/1491 726/23 |

FOREIGN PATENT DOCUMENTS

| | | |
|---|---|---|
| CN | 113282933 A | 8/2021 |
| CN | 113504999 A | 10/2021 |
| CN | 113643553 A | 11/2021 |
| CN | 113971089 A | 1/2022 |
| CN | 114492841 A | 5/2022 |
| WO | WO-2021/120676 A1 | 6/2021 |

OTHER PUBLICATIONS

Liao, "Efficient Asynchronous Federated Learning Mechanism for Edge Network Computing," Beijing University of Posts and Telecommunications, Jun. 4, 2020, with English abstract on p. 7 (64 pages).

Lim et al, "Federated Reinforcement Learning Acceleration Method for Precise Control of Multiple Devices," IEEE Access, May 24, 2021, vol. 9, pp. 76296-76306, (11 pages).

* cited by examiner

MODEL GRADIENT UPDATE METHOD AND DEVICE

CROSS REFERENCES TO RELATED APPLICATIONS

The present disclosure is a National Stage of International Application No. PCT/CN2022/112615, filed on Aug. 15, 2022, which claims priority to Chinese Patent Application No. 202210107380.3, entitled "Model Gradient Update Method and Device", and filed to the China National Intellectual Property Administration on Jan. 28, 2022, the entire contents of which are incorporated herein by reference.

TECHNICAL FIELD

The present disclosure relates to the technical field of model training, and in particular to a model gradient update method and device.

BACKGROUND

Horizontal federated learning, also known as federated learning by sample partitioning, can be applied to scenarios where the data sets of each participant in federated learning have the same characteristics and different samples.

It is usually assumed that the participants in a horizontal federated learning system are all honest, and the object that needs to be guarded against is an honest but curious central server. That is, it is usually assumed that only the central server can threaten the privacy security of data participants. In a horizontal federated learning system, multiple participants with the same data characteristics collaboratively train a model with the help of a central server. It mainly includes the following steps: each of the participants calculates the model gradient locally, and transmits the gradient (the gradient needs to be encrypted) to the central server. The central server aggregates multiple gradients. The central server transmits the aggregated gradients (the gradients also need to be encrypted) to all participants. Each of the participants updates their model parameters using the received gradients.

The above steps continue iteratively until the loss function converges or reaches the upper limit of the allowed iterations or the allowed training time. This architecture is independent of specific machine learning algorithms (such as logistic regression and deep neural networks), and all participants will share final model parameters.

SUMMARY

Embodiments of the present disclosure disclose a model gradient update method, which is applied to the central server and includes:

performing, by the central server, gradient update processes repeatedly until a stopping condition is satisfied; where one of the gradient update processes includes:
receiving multiple first gradients transmitted by multiple nodes respectively, where the first gradients are obtained by each of the multiple nodes using sample data to train a model to be trained in the node one or more times; determining a second gradient based on the multiple first gradients and probability of each of the multiple nodes in a current gradient update process, where the probability of each of the multiple nodes is determined by the Actor-Critic network based on probability of each of the multiple nodes in a previous gradient update process; and transmitting the second gradient to the multiple nodes respectively, where the multiple nodes respectively update a weight of the model to be trained using the second gradient.

In some embodiments, the Actor-Critic network includes an Actor network, at least one Critic network, and a reward function;
the reward function is configured to determine a reward value based on probabilities of the multiple nodes determined in the previous gradient update process, and transmit the reward value to the at least one Critic network;
the at least one Critic network is configured to determine a target Q value and transmit the target Q value to the Actor network; and
the Actor network is configured to determine the probability of each of the multiple nodes in the current gradient update process based on the target Q value.

In some embodiments, the target Q value is a smallest Q value among Q values determined by multiple Critic networks.

In some embodiments, the reward function satisfies:

$$r = g\frac{B}{A};$$

where A represents a first accuracy rate, B represents a second accuracy rate, a value of g is greater than or equal to 1; the first accuracy rate is an accuracy rate of a trained model obtained by the central server and the multiple nodes based on a federated average learning algorithm; the second accuracy rate is an average of third accuracy rates respectively transmitted by the multiple nodes; and the third accuracy rate is obtained during a model training process same as a model training process in which the first gradient is obtained by the multiple nodes using sample data to train the model to be trained in the multiple nodes.

In some embodiments, when a value of B/A is greater than 1, the value of g is greater than 1; and when the value of B/A is smaller than or equal to 1, the value of g is equal to 1.

In some embodiments, the Actor-Critic network includes three Critic networks, for each of the three Critic networks, a Q value determined in the current gradient update process is based on a Q value gradient and a Q value determined during the previous gradient update process; where the Q value gradient is determined based on a first parameter, and the first parameter satisfies following formula:

$$J = \mathbb{E}_{(s,a)\sim D}\frac{1}{2}[k(Q_{\theta_3}(s_t, a_t) - (r(s_t, a_t) + \gamma V_{\theta_3}(s_{t+1}, a_{t+1}))^2 + l(Q_{\theta_i}(s_t, a_t) - (r(s_t, a_t) + \gamma V_{\theta_i}(s_{t+1}, a_{t+1}))^2];$$

$$V_{\theta_i}(s_{t+1}, a_{t+1}) = \mathbb{E}_{a\sim\pi_\phi}[(Q_{\theta_i}(s_t, a_t) - \alpha_t \ln q(\pi_t(a_t \mid s_t)];$$

where J represents the first parameter; t represents a number of times of the current gradient update; k>0, l>0, k+l=1; θ1, θ2, and θ3 respectively represent three Critic networks; θi represents a network corresponding to a minimum value among latest Q values determined by the three Critic networks respectively represented by θ1, θ2 and θ3; $s_t$ represents a state during a t-th gradient update process; $a_t$ represents probability of the multiple nodes during the t-th gradient update process; $Q_{\theta_i}(s_t, a_t)$ represents a Q value determined by the Critic network corresponding θi under $s_t$, $a_t$ condition during the t-th gradient update process; $Q_{\theta_3}(s_t, a_t)$ represents a Q value determined by the Critic network corresponding θ3 under $s_t$, $a_t$ condition during the t-th gradient update process; $r(s_t, a_t)$ represents a reward value under $s_t$, $a_t$ condition during the t-th gradient update process; a value of γ is larger than 0; $\pi_t(a_t|s_t)$ represents probability of $a_t$ under $s_t$ condition; q represents an index of entropy; $\ln_q$ represents entropy; and a value of $\alpha_t$ is not equal to 0.

In some embodiments, the α used in the current gradient update process is determined based on a α gradient and a α used in a previous gradient update process, and the α gradient satisfies following formula:

$$J(\alpha) = \mathbb{E}_{a \sim D, a \sim \pi_\phi}[-\alpha_{t-1}(\ln_q(\pi_t(a_t | s_t) + H)];$$

where J(α) represents the α gradient, $\alpha_{t-1}$ represents the α used in the previous gradient update, and H represents an ideal minimum expected entropy.

In some embodiments, the k and l are determined based on a variance of the accuracy of the model before gradient update in the multiple nodes.

In some embodiments, the probability of the node output by the Actor network in the current gradient update process is determined based on a probability gradient and probability of the node output in the previous gradient update process, and the probability gradient satisfies following formula:

$$J(\pi_\phi) = \mathbb{E}_{(s,a) \sim D}[\alpha_t \ln_q(\pi_t(a_t | s_t) - (Q_{\theta_i}(s_t, a_t)];$$

where $J(\pi_\phi)$ represents the probability gradient, t represents a number of times of the current gradient update; $\theta_1$, $\theta_2$, and $\theta_3$ respectively represent three Critic networks; $\theta_i$ represents a network corresponding to a minimum value among latest Q values determined by the three Critic networks respectively represented by $\theta_1$, $\theta_2$ and $\theta_3$; $s_t$ represents a state during a t-th gradient update process; $a_t$ represents probability of the multiple nodes during the t-th gradient update process; $Q_{\theta_i}(s_t, a_t)$ represents a Q value determined by the Critic network corresponding $\theta_i$ under $s_t$, $a_t$ condition during the t-th gradient update process; $\pi_t(a_t|s_t)$ represents probability of $a_t$ under $s_t$ condition; q represents an index of entropy; $\ln_q$ represents entropy; $\alpha_t$ represents α used in the current gradient update, and a value of $\alpha_t$ is not equal to 0.

In some embodiments, the central server and the multiple nodes perform gradient updates based on a federated learning architecture.

Embodiments of the present disclosure provide a model gradient update device, configured to perform gradient update processes repeatedly until a stopping condition is satisfied, including: a receiving module, a processing module and a transmitting module;

where for one of the gradient update processes:

the receiving module is configured to receive multiple first gradients transmitted by multiple nodes respectively, where the first gradients are obtained by each of the multiple nodes using sample data to train a model to be trained in the node one or more times;

the processing module is configured to determine a second gradient based on the multiple first gradients and probability of each of the multiple nodes in a current gradient update process, where the probability of each of the multiple nodes is determined by the Actor-Critic network based on probability of each of the multiple nodes in a previous gradient update process; and the transmitting module is configured to transmit the second gradient to the multiple nodes respectively, where the multiple nodes respectively update a weight of the model to be trained using the second gradient.

Embodiments of the present disclosure provide a model gradient update device, including a processor and a memory;

the memory is configured to store computer programs or instructions; and the processor is configured to execute part or all of the computer programs or instructions stored in the memory; where the part or all of the computer programs or instructions, when executed by the processor, implements any one of the model gradient update methods described above.

Embodiments of the present disclosure provide a computer-readable storage medium storing a computer program, where the computer program includes instructions for implementing any one of the model gradient update methods described above.

BRIEF DESCRIPTION OF FIGURES

In order to more clearly illustrate embodiments of the present disclosure or technical solutions in the prior art, the accompanying figures required in the description of the embodiments will be briefly introduced below. Obviously, the accompanying figures in the following description are only some embodiments of the present disclosure. For those skilled persons in the art, other drawings can be obtained based on the drawings without exerting creative efforts.

DETAILED DESCRIPTION

Embodiments of the present disclosure will be further illustrated below in details with reference to the accompanying figures. Obviously the described embodiments are merely a part of the embodiments of the present disclosure but not all the embodiments. Based upon the embodiments of the present disclosure, all of other embodiments obtained by those ordinary skilled persons in the art without creative work pertain to the protection scope of the embodiments of the present disclosure.

Currently, in the horizontal federated learning scenario, the central server performs average aggregation of gradients. Considering the different performance of different participants, the model trained using the gradient averaging method has poor results.

The central server performs gradient update processes repeatedly until a stopping condition is satisfied. The stopping condition is, for example, that the loss function converges, or reaches the upper limit of the allowed number of iterations, or reaches the allowed training time.

Figure 1:
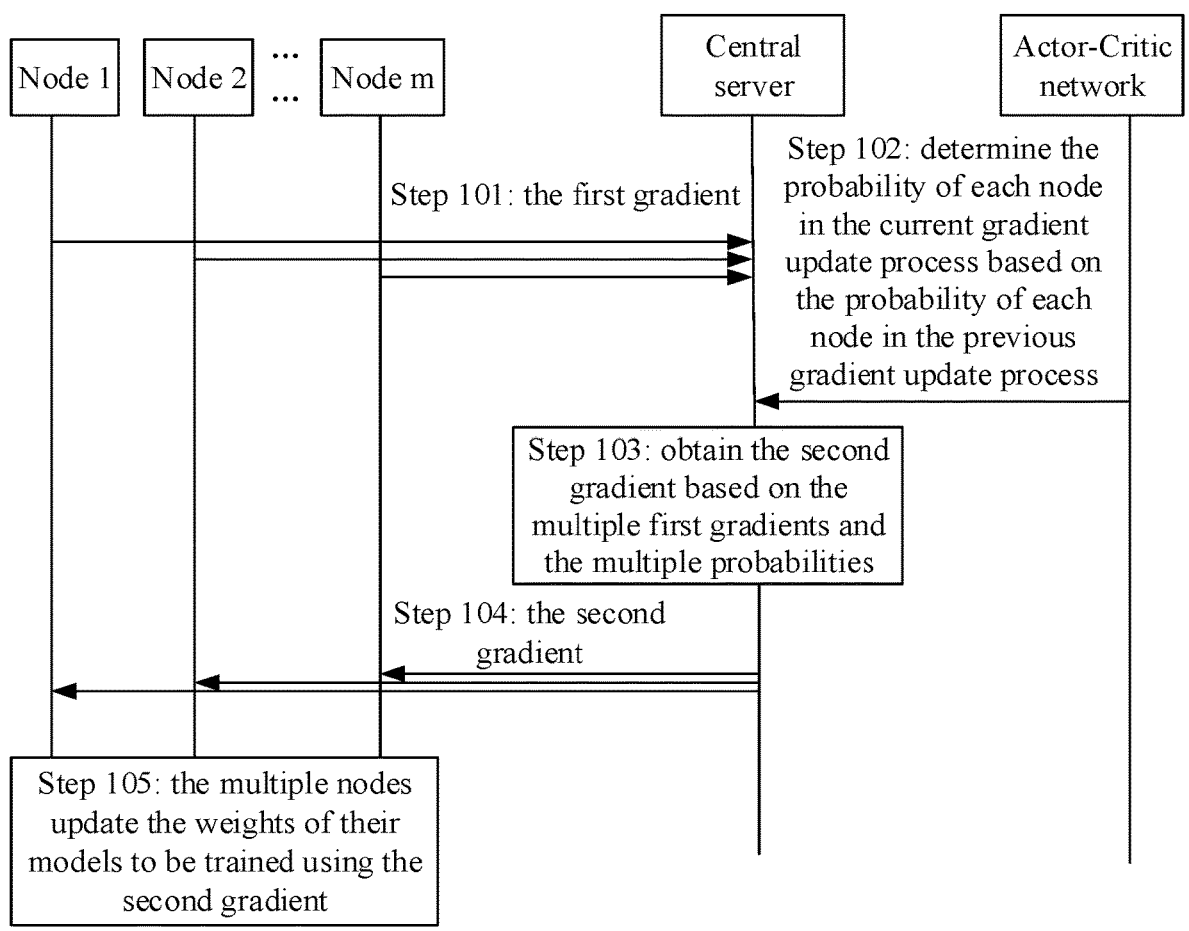
FIG. 1 is a schematic diagram of a model gradient update process provided by the disclosure.

As shown in FIG. 1, any one of the gradient update processes is introduced as follow.

Step 101: the multiple nodes (such as node 1, node 2 . . . node m) respectively transmit the first gradient to the central server. Correspondingly, the central server receives the first gradients respectively transmitted by the multiple nodes.

The first gradients are obtained by each of the multiple nodes using sample data to train a model to be trained in the node one or more times. The gradient transmitted by a node to the central server is called the first gradient. The first gradients transmitted by multiple nodes may be the same or different.

The node can be a car terminal, and the sample data can be the data generated during autonomous driving. Different driving data are generated while the car is driving. The driving data is scattered in various nodes (car terminals), and there are characteristics of uneven data quality and uneven node performance. The model can be a model that needs to be used for automatic driving or related to user habits.

Step 102: the Actor-Critic network determines the probability of each node in the current gradient update process based on the probability of each node in the previous gradient update process.

It can be understood that, when the current gradient update process is the first gradient update process, the probability of each node in the previous gradient update process is the initially set probability of each node.

The sum of the probabilities of multiple nodes can be 1.

The Actor-Critic network can output the probabilities of multiple nodes after each gradient update process, or the Actor-Critic network can output the probabilities of multiple nodes after multiple gradient update process.

The Actor-Critic network may or may not be on the central server.

Step 103: the central server obtains the second gradient based on the multiple first gradients and the multiple probabilities.

When determining the second gradient based on the multiple first gradients and the multiple probabilities, the multiple first gradients and multiple probabilities can be used to determine the second gradient using a weighted average. For example, the first gradient transmitted by node 1, node 2, and node 3 is p1, p2, p3, respectively; and the probabilities of the three nodes are 0.2, 0.4, 0.4, respectively; then the value of the second gradient is 0.2p1+0.4p2+0.4p3. The process can also be called a deep reinforcement learning data fusion algorithm, which determines a second gradient based on the multiple first gradients and the multiple probabilities.

Step 104: the central server transmits the second gradient to the multiple nodes (for example, node 1, node 2 . . . node m) respectively. Correspondingly, the multiple nodes receive the second gradient from the central server.

The gradient transmitted by the central server to the node is called the second gradient, and the second gradients transmitted to the multiple nodes are the same.

Step 105: the multiple nodes respectively update the weights of their models to be trained using the second gradient.

When the stopping condition is satisfied, the updated model is the trained model.

When the stop condition is not satisfied, each node can use sample data to train the model to be trained in the node one or more times to obtain a new first gradient, and continue to repeat steps 101 to 105.

The disclosure takes into account the probability of each node and can optimize node participation to make the determined model better.

In some embodiments, the central server and the multiple nodes perform gradient updates based on a federated learning architecture. The sample data of each node is private and not shared with other nodes and the central server. When the node and the central server transmit the first gradient and the second gradient, the first gradient and the second gradient are encrypted.

Figure 2:
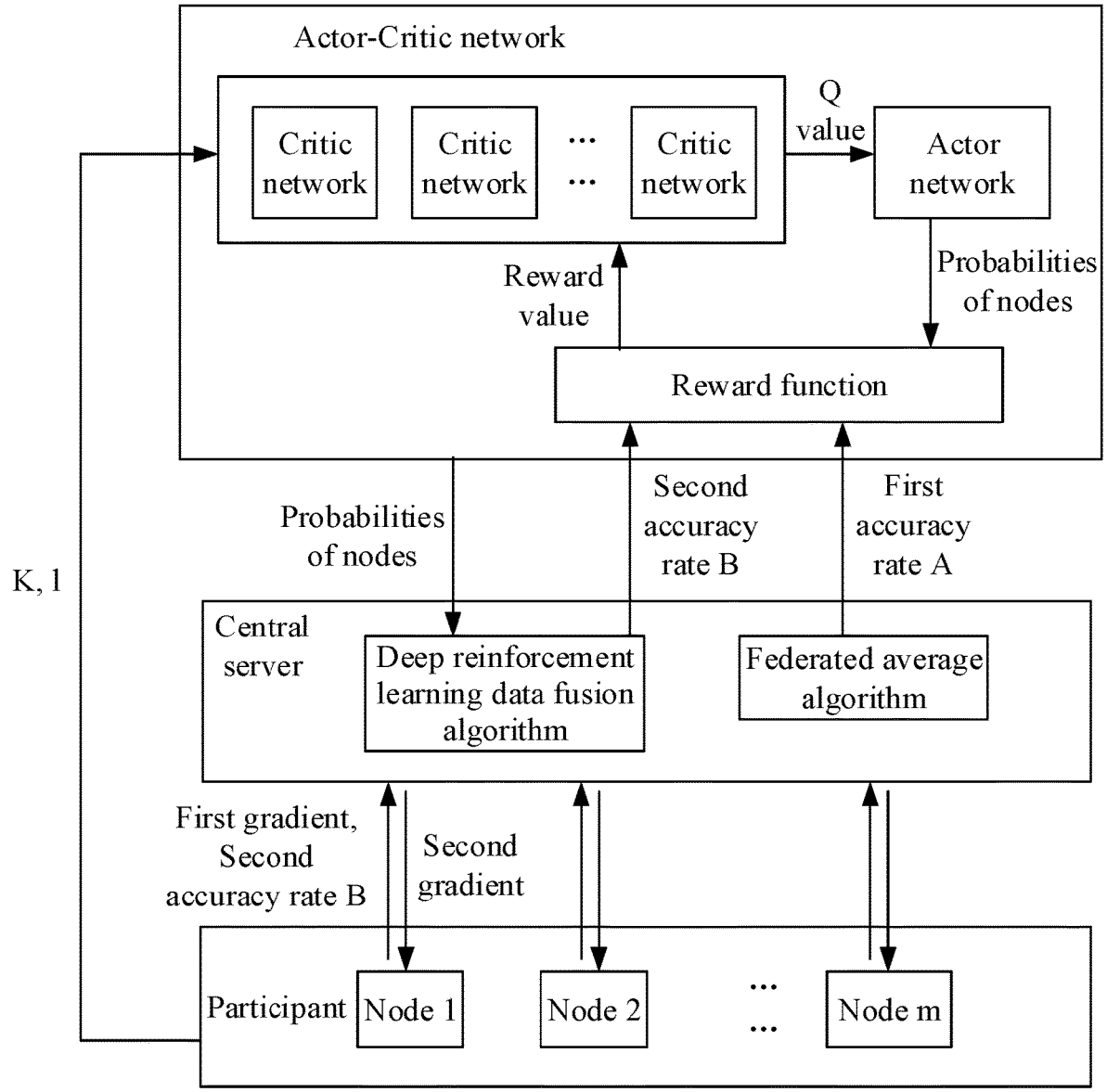
FIG. 2 is an architecture diagram of a model gradient update system provided by the disclosure.

As shown in FIG. 2, a gradient update system architecture diagram is introduced, including multiple nodes, a central server, and an Actor-Critic network. The Actor-Critic network may or may not be on a central server. Actor-Critic consists of two parts from the name, Actor and Critic. Here, the Actor is responsible for generating actions and interacting with the environment, and the Critic is responsible for evaluating the Actor's performance and guiding the Actor's actions in the next stage.

The Actor-Critic network includes an Actor network, at least one Critic network, and a reward function.

The reward function is configured to determine a reward value based on the probabilities of the multiple nodes determined in the previous gradient update process, and transmit the reward value to the at least one Critic network.

The at least one Critic network is configured to determine a target Q value and transmit the target Q value to the Actor network. Each Critic network determines one Q value. When there is one Critic network, the Q value determined by the Critic network is the target Q value. When there are multiple Critic networks, one Q value can be selected from multiple Q values as the target Q value. For example, the target Q value is the smallest Q value among the Q values determined by multiple critic networks. When there are multiple Critic networks, it is equivalent to setting up multiple evaluators to evaluate the performance of the Actor more accurately, making the actions taken by the Actor more accurate, and then the probabilities of multiple nodes obtained are in line with the performance of multiple nodes.

The Actor network determines the probability of each of the multiple nodes in the current gradient update process based on the target Q value, and transmits the probabilities of the multiple nodes to the reward function, looping multiple times until stopping.

The disclosure can use the existing Actor-Critic network to determine the probability, or it can improve the existing Actor-Critic network, such as setting up multiple Critic networks, improving the algorithms involved in the Critic network, improving the algorithms involved in the Actor network, or improving the reward function. It can be understood that the improvements only involve specific details, the operating mechanism of the improved Actor-Critic network is similar to the existing Actor-Critic network.

Combined with the system disclosed in FIG. 2, the gradient update process of the application is introduced in detail.

The initialize the parameters involved in the Actor-Critic network, including but not limited to: initializing the parameters involved in the Critic network, initializing the parameters involved in the Actor network, and initializing the parameters involved in the reward function.

The central server and multiple nodes obtain the trained model based on the federated average learning algorithm, and determine the first accuracy rate A of the trained model.

Node 1, node 2 . . . , node m performs one or more training based on the currently saved model to obtain the first gradient and the third accuracy rate B', and each node transmits the first gradient and the third accuracy rate B' to the central server. The three accuracy rate and the first gradient are obtained during the same model training of the node. Here, the currently saved model can also be called a model to be trained, for example, the currently saved model can be a model that still need to perform the gradient update process from steps 101 to 105, or the currently saved model can be a model that has been performed once or more the gradient update process from steps 101 to 105.

The central server calculates the average of multiple third accuracy rates B' to obtain the second accuracy rate B.

The reward function determines the reward value r based on the first accuracy rate A and the second accuracy rate B. The first accuracy rate is the accuracy rate of the trained model obtained by the central server and the multiple nodes based on federated learning; the second accuracy rate is the average of the third accuracy rates respectively transmitted by the multiple nodes, and the third accuracy rate is obtained during a model training process s as a model training process in which the first gradient is obtained by the multiple nodes using sample data to train the model to be trained in the multiple nodes.

For example, the reward function is expressed as:

$$r = g\frac{B}{A}.$$

The larger the B/A is, the larger the reward value r is. It can be understood that in any gradient update process, the value of A is the same, and the value of B may be the same or different. The value of g is greater than or equal to 1. In some embodiments, the disclosure sets two reward functions, respectively: when the value of B/A is larger than 1, the value of g is a constant greater than 1, which can be strongly guided to complete gradient training faster; when the value of B/A is smaller than or equal to 1, the value of g is equal to 1.

The Q value (i.e., the updated Q value) determined in the gradient update process of the Critic network is determined based on the Q value gradient and the Q value determined in the previous gradient update process (i.e., the Q value before the update). For example, the updated Q value is equal to the sum of the Q value before the update and the Q value gradient. It can be understood that, when the current gradient update is the first gradient update, the Q value output previous time is the initially set Q value.

In one embodiment, the Q value gradient is determined based on a first algorithm and a second algorithm, where the first algorithm has the characteristic of favoring a specific action in training, and the second algorithm has the characteristic of balanced selection of various tasks in training. For example, the first algorithm may be a Deep Deterministic Policy Gradient (DDPG) algorithm, the second algorithm may be a SAC algorithm, and the SAC algorithm may be a Soft Actor Critic with Automatic Entropy Adjustment (SAC-AEA) reinforcement learning algorithm. DDPG is constrained by the update strategy of the algorithm itself, and in the later stage of training, it tends to lean towards a specific action, which is not conducive to scheduling the probability of multiple nodes and is unfavorable for achieving overall model fusion. It will result in the final trained model being highly correlated with the data of a certain node, and the contribution of model data from other nodes to the model results will be reduced, which greatly reduces the utilization efficiency of multi-party data, and even leads to poor model training results or over-fitting problems. The SAC-AEA reinforcement learning algorithm can relatively balance the selection of various actions. However, for actual federated learning frameworks, the data quality, contribution to the model, and local computing power(such as the computational efficiency of local devices), of each node are different (in the disclosure, they can be expressed as the dominant and non-dominant parties). Balancing the fusion of their data is clearly not conducive to the improvement of model training results, or under-fitting may occur, so that the complete data features cannot be fully represented. In this application, the Q value determined by the Critic network is updated based on the DDPG algorithm and the SAC algorithm. Integrating the DDPG algorithm and the SAC algorithm can combine the advantages of the two algorithms so that the trained model integrates the performance of multiple nodes and the model is better. The disclosure can set a first weight for the DDPG algorithm and a second weight for the SAC algorithm. The DDPG algorithm, the first weight, the SAC algorithm and the second weight are configured to determine the Q value gradient. The first weight and the second weight are determined based on the variance of the accuracy of the model before gradient update among the multiple nodes.

In one embodiment, in the Critic network, a Q value update algorithm based on composite adaptive adjustable weights is proposed; the Q value gradient is determined based on the first parameter J, for example, the Q value gradient is the product of the first parameter J and the step size, the step size is not 0. Taking three Critic networks as an example, the first parameter J satisfies the following formula:

$$J = \mathbb{E}_{(s,a) \sim D} \frac{1}{2}[k(Q_{\theta_3}(s_t, a_t) - (r(s_t, a_t) + \gamma V_{\theta_3}(s_{t+1}, a_{t+1})))^2 +$$
$$l(Q_{\theta_i}(s_t, a_t) - (r(s_t, a_t) + \gamma V_{\theta_i}(s_{t+1}, a_{t+1})))^2]; \text{ or}$$
$$J = \mathbb{E}_{(s,a) \sim D}[k(Q_{\theta_3}(s_t, a_t) - (r(s_t, a_t) + \gamma V_{\theta_3}(s_{t+1}, a_{t+1})))^2 +$$
$$l(Q_{\theta_i}(s_t, a_t) - (r(s_t, a_t) + \gamma V_{\theta_i}(s_{t+1}, a_{t+1})))^2];$$
$$\text{where, } V_{\theta_i}(s_{t+1}, a_{t+1}) = \mathbb{E}_{a \sim \pi_\phi}[(Q_{\theta_i}(s_t, a_t) - \alpha_t \ln_q(\pi_t(a_t \mid s_t))].$$

The embodiment uses the probability that the Actor-Critic network can output multiple nodes per cycle as an example. t is the number of gradient updates, for example, the t-th gradient update process, and t is an integer greater than or equal to 1.

k>0, l>0, k+l=1; k and l can be fixed values, can be artificially set values, or can be determined based on the variance of the accuracy of the model before gradient update among the multiple nodes; the variance of the accuracy can represent the difference in node performance (such as computing power) to a certain extent. The larger the variance is, the greater the performance difference of nodes is. On the contrary, the smaller the variance is, the smaller the performance difference of multiple nodes is.

$\theta_1$, $\theta_2$, and $\theta_3$ respectively represent three Critic networks; $\theta_i$ represents a network corresponding to a minimum value among latest Q values determined by the three Critic networks respectively represented by $\theta_1$, $\theta_2$ and $\theta_3$. It can be understood that in this gradient update process, the latest Q value determined by the three Critic networks refers to the Q value determined during the previous gradient update process (the current gradient update is the t-th time, then the previous time is the (t−1) th time).

$S_t$ represents a state during a t-th gradient update process. The $s_t$ can be the accuracy or average accuracy of each node, the gradient or average gradient of each node, the variance of each node, etc.

$a_t$ represents probability of the multiple nodes during the t-th gradient update process; $a_t$ can also be called an action.

$Q_{\theta_i}(s_t, a_t)$ represents a Q value determined by the Critic network corresponding $\theta_i$ under $s_t$, $a_t$ condition during the t-th gradient update process; $Q_{\theta_3}(s_t, a_t)$ represents a Q value determined by the Critic network corresponding $\theta_3$ under $s_t$, $a_t$ condition during the t-th gradient update process.

$r(s_t, a_t)$ represents a reward value under $s_t$, $a_t$ condition during the t-th gradient update process.

$\gamma$ is the attenuation factor, $\gamma$ is greater than 0.

$\pi_t(a_t|s_t)$ is the conditional probability, $\pi_t(a_t|s_t)$ represents probability of $a_t$ under $s_t$ condition.

q is an index of entropy (such as Tasslis entropy), q is an integer greater than or equal to 1, which can be 1 or 2 or 3. $\ln_q$ represents entropy, which is a curve. When q is different, $\ln_q$ is a family of curves.

E is the numerical expectation. E calculates the expectation for the data within [*], the independent variables are $s_t$ and $a_t$. The contents in [ ] in the above formula are implicit expressions of $s_t$ and $a_t$.

D is the memory bank (can also be called the experience playback pool, or cache space), (s, a)~D refers to s, a in the memory bank. Assuming that the memory bank D can store the number M of s and the number M of a, the memory bank D is a cyclic coverage. The Actor-Critic network can first loop M times to obtain the number M of s and the number M of a. The Actor-Critic network only outputs the probability of the node at the (M+1) th loop, while the probability of nodes not being output by the Actor-Critic network in the previous M loops, or the probability of the node being output by the Actor-Critic network in the previous M loops can be ignored.

$a \sim \pi_\phi$ represents that $\pi_\phi$ is determined based on a, for example, multiple a form a $\pi_\phi$ curve (or set).

$\alpha_t$ represents $\alpha$ used in the current gradient update, $\alpha$ can be a fixed value, which is not 0. $\alpha$ can also be a variable (i.e., adaptive parameter). The $\alpha$ (updated) used in the current gradient update is determined based on the $\alpha$ gradient and the $\alpha$ (before update) used in the previous gradient update. For example, the $\alpha$ (updated) used in the current gradient update is equal to the sum of the $\alpha$ gradient and the $\alpha$ (before update) used in the previous gradient update. It can be understood that, when the current gradient update is the first gradient update, the $\alpha$ used in the previous time is the initial set $\alpha$. The $\alpha$ gradient satisfies the following formula:

$$J(\alpha) = \mathbb{E}_{a \sim D, a \sim \pi_\phi}[-\alpha_{t-1}(\ln_q(\pi_t(a_t|s_t)) + H)];$$

where, $J(\alpha)$ represents the $\alpha$ gradient, $\alpha_{t-1}$ represents $\alpha$ used in the previous gradient update, and H represents an ideal minimum expected entropy, for example, the entropy is Tasslis entropy.

The Q value update method with composite adaptive adjustable weight can adaptively adjust the gradient weight parameters. According to the actual scenario, only the weight parameters need to be adjusted for specific action selection or balanced action selection, so that the model information of each participant can be scheduled according to the specific situation.

The probability of the node output by the Actor network in the current gradient update process (the probability of the node after the update) is equal to the sum of the probability of the node output in the previous gradient update process (the probability of the node before the update) and the probability gradient.

The concept of Tasslis entropy and adaptive parameters are integrated into the Actor network, and the probability gradient is determined based on the following formula:

$$J(\pi_\phi) = \mathbb{E}_{(s,a) \sim D}[\alpha_t \ln_q(\pi_t(a_t|s_t)) - (Q_{\theta_i}(s_t, a_t)];$$

where, $J(\pi_\phi)$ represents the probability gradient; $\alpha_t$ represents the obtained $\alpha$ in the current gradient update process (the t-th gradient update process); $\theta_i$ represents a network corresponding to a minimum value among latest Q values determined by the three Critic networks respectively represented by $\theta_1$, $\theta_2$ and $\theta_3$. It can be understood that, in the current gradient update process, the latest Q values determined by the three Critic networks refer to the Q values determined in the current gradient update process (for example, the t-th gradient update process).

For the server side in the federated framework, the data fusion algorithms of different nodes are adjusted, and an optimized fusion strategy is designed that combines the deep reinforcement learning data fusion model with the federated average algorithm. The participation of different nodes and the degree of data utilization during training can be adjusted.

The method in the embodiments of the present disclosure is introduced above, and the device in the embodiments of the present disclosure will be introduced below. The method and the device are conceived based on the same technology concept. Due to the similar principles of solving problems, the implementation of the device and method can be referred to each other, and any repetition will not be repeated.

Embodiments of the present disclosure can divide the device into functional modules according to the above method embodiments. For example, the device can be divided into functional modules corresponding to each function, or two or more functions can be integrated into one module. These modules can be implemented in the form of hardware or software function modules. It should be noted that the division of modules in the embodiments of the present disclosure is schematic and is only a logical function division. There may be other division methods during specific implementation.

Figure 3:
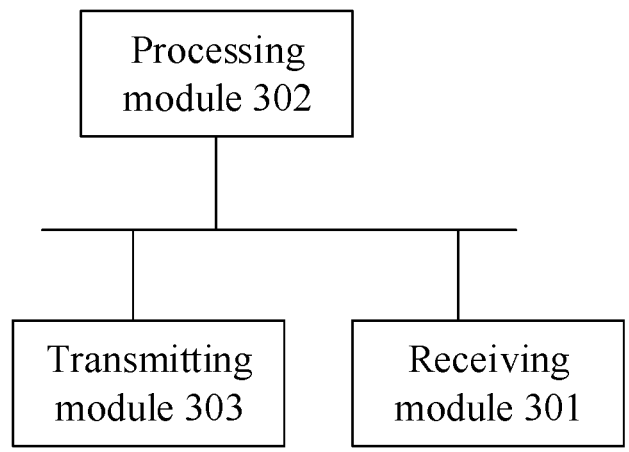
FIG. 3 is a structural diagram of a model gradient update device provided by the disclosure.

Based on the same technical concept as the above method, as shown in FIG. 3, a model gradient update device is provided, including:

a receiving module 301 is configured to receive multiple first gradients transmitted by multiple nodes respectively, wherein the first gradients are obtained by each of the multiple nodes using sample data to train a model to be trained in the node one or more times;

a processing module 302 is configured to determine a second gradient based on the multiple first gradients and probability of each of the multiple nodes in a current gradient update process, wherein the probability of each of the multiple nodes is determined by the Actor-Critic network based on probability of each of the multiple nodes in a previous gradient update process; and a transmitting module 303 is configured to transmit the second gradient to the multiple nodes respectively, wherein the multiple nodes respectively update a weight of the model to be trained using the second gradient.

The above process is the gradient update process once, and the gradient update process is repeatedly performed until the stop condition is satisfied.

Figure 4:
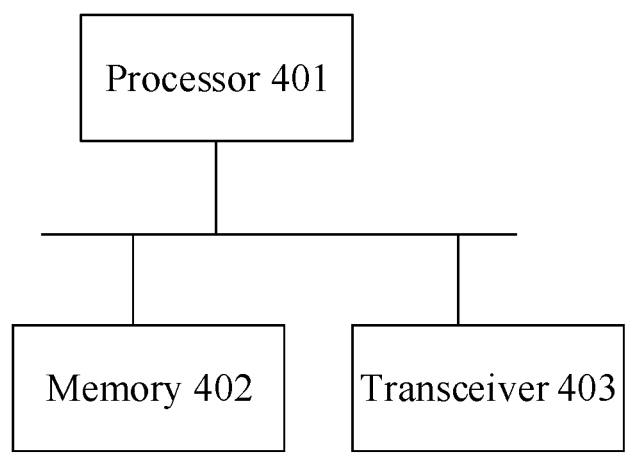
FIG. 4 is a structural diagram of a model gradient update device provided by the application.

Based on the same technical concept as the above method, as shown in FIG. 4, a model gradient update device is provided, including a processor 401 and a memory 402. In some embodiments the model gradient update device can further include a transceiver 403;

the memory 402 is configured to store computer programs or instructions; and the processor 401 is configured to execute part or all of the computer programs or instructions stored in the memory; where the part or all of the computer programs or instructions, when executed by the processor, implements any one of the above model gradient update methods. For example, the transceiver 403 performs receiving and transmitting actions, and the processor 401 performs other actions besides receiving and transmitting actions.

Embodiments of the present disclosure provide a computer-readable storage medium for storing a computer program, where the computer program includes instructions for implementing any one of the model gradient update methods described above.

Embodiments of the present disclosure also provide a computer program product, which includes: computer program code. When the computer program code is run on a computer, the computer can execute the method for updating the model gradient provided above.

Embodiments of the present disclosure also provide a communication system, which includes: nodes and a central server that perform the above method of model gradient update.

In addition, the processor mentioned in the embodiments of the disclosure may be a Central Processing Unit (CPU), a baseband processor, the baseband processor and the CPU may be integrated together or separated. The processor may be a Network Processor (NP) or a combination of CPU and NP. The processor may further include a hardware chip or other general-purpose processor. The above-mentioned hardware chip may be an Application-Specific Integrated Circuit (ASIC), a Programmable Logic Device (PLD) or a combination thereof. The above-mentioned PLD can be a Complex Programmable Logic Device (CPLD), a Field-Programmable Gate Array (FPGA), a General Array Logic (GAL) and other programmable logic devices, discrete gate or transistor logic devices, discrete hardware components, etc. or any combination thereof. A general-purpose processor may be a microprocessor, the processor, or any conventional processor, etc.

The memory mentioned in the embodiments of the present disclosure may be volatile memory or non-volatile memory, or may include both volatile and non-volatile memory. The non-volatile memory can be Read-Only Memory (ROM), Programmable Read-Only Memory (PROM), erasable programmable read-only memory (Erasable PROM, EPROM), Electrically Erase Programmable Read-Only Memory (Electrically EPROM, EEPROM) or flash memory. The volatile memory may be Random Access Memory (RAM), which is used as an external cache. By way of illustration, but not limitation, many forms of RAM are available, such as Static Random Access Memory (SRAM), Dynamic Random Access Memory (Dynamic RAM, DRAM), Synchronous Dynamic Random Access Memory (Synchronous DRAM, SDRAM), Double Data Rate Synchronous Dynamic Random Access Memory (Double Data Rate SDRAM, DDR SDRAM), Enhanced Synchronous Dynamic Random Access Memory (Enhanced SDRAM, ESDRAM), Synchronous Link Dynamic Random Access Memory (Synchlink DRAM, SLDRAM)) and Direct Rambus Random Access Memory (Direct Rambus RAM, DR RAM). It should be noted that the memories described herein are intended to include, but are not limited to, these and any other suitable types of memories.

The transceiver mentioned in the embodiments of the disclosure may include a separate transmitter and/or a separate receiver, or the transmitter and receiver may be integrated. The transceiver can work under the instructions of the corresponding processor. In some embodiments, the transmitter can correspond to the transmitter in the physical device, and the receiver can correspond to the receiver in the physical device.

The ordinary skilled persons in the art can appreciate that the method steps and units described in the disclosed embodiments in the disclosure can be implemented by electronic hardware, computer software, or a combination of both. In order to clearly illustrate the interchangeability of hardware and software, the steps and compositions of each embodiment have been generally described according to functions in the above description. Whether these functions are performed in hardware or software depends on the specific application and design constraints of the technical solution. The ordinary skilled persons in the art may implement the described functionality using different methods for each specific application, but such implementations should not be considered beyond the scope of the disclosure.

In the embodiments provided in the disclosure, it should be understood that the disclosed systems, devices and methods can be implemented in other ways. For example, the device embodiments described above are only illustrative. For example, the division of the units is only a logical function division. In actual implementation, there may be other division methods. For example, multiple units or components may be combined or can be integrated into another system, or some features can be ignored, or not implemented. In addition, the coupling or direct coupling or communication connection between each other shown or discussed may be an indirect coupling or communication connection through some interfaces, devices or units, or may be electrical, mechanical or other forms of connection.

The units described as separate components may or may not be physically separated, and the components shown as units may or may not be physical units, that is, they may be located in one place, or they may be distributed to multiple network units. Some or all of the units may be selected according to actual needs to achieve the purpose of the embodiments of the present disclosure.

In addition, each functional unit in various embodiments of the present disclosure may be integrated into a single processing unit, or each unit may physically exist separately, or two or more units may be integrated into one unit. The above integrated units can be implemented in the form of hardware or software functional units. When the integrated unit is implemented in the form of a software functional unit and sold or used as an independent product, it may be stored in a computer-readable storage medium. Based on this understanding, the essence of the technical solution or the content that contributes to existing technology, or all or part of the technical solution can be reflected in the form of software products. The computer software product is stored in a storage medium, including several instructions to cause a computer device (which may be a personal computer, a server, or a network device, etc.) to execute all or part of the steps of the methods described in various embodiments of the present disclosure. The aforementioned storage media include: U disk, mobile hard disk, Read-Only Memory (ROM), Random Access Memory (RAM), magnetic disk or optical disk and other media that can store program code.

"And/or" in the application describes the relationship between associated objects, indicating that there can be three relationships, for example, A and/or B, which can mean: A alone exists, A and B exist simultaneously, and B alone exists. The character "/" generally indicates that the related objects are in an "or" relationship. The multiple mentioned in the disclosure refers to two or more than two. In addition, it should be understood that in the description of the disclosure, words such as "first" and "second" are only used for the purpose of distinguishing the description, and cannot be understood as indicating or implying relative importance, nor can they be understood as indicating or implying order.

Although the preferred embodiments of the present disclosure have been described, those skilled persons in the art will be able to make additional changes and modifications to these embodiments once the basic inventive concepts are apparent. Therefore, it is intended that the appended claims be construed to include the preferred embodiments and all changes and modifications that fall within the scope of the disclosure.

Obviously, those skilled persons in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A model gradient update method, applied to a central server, comprising:
    performing, by the central server, gradient update processes repeatedly until a stopping condition is satisfied; wherein one of the gradient update processes comprises:
    receiving a plurality of first gradients transmitted by a plurality of nodes respectively, wherein the first gradients are obtained by each of the plurality of nodes using a sample data to train a model to be trained in each of the plurality of nodes one or more times;
    obtaining a second gradient based on the plurality of first gradients and a first probability of each of the plurality of nodes in a current gradient update process, wherein the first probability of each of the plurality of nodes is determined by an Actor-Critic network based on a second probability of each of the plurality of nodes in a previous gradient update process; and
    transmitting the second gradient to the plurality of nodes respectively, wherein the plurality of nodes respectively update a weight of the model to be trained using the second gradient;
    wherein the Actor-Critic network comprises an Actor network, at least one Critic network, and a reward function;
    the reward function is configured to determine a reward value based on probabilities of the plurality of nodes determined in the previous gradient update process, and transmit the reward value to the at least one Critic network;
    the at least one Critic network is configured to determine a target Q value and transmit the target Q value to the Actor network; and
    the Actor network is configured to determine the first probability of each of the plurality of nodes in the current gradient update process based on the target Q value;
    wherein the reward function satisfies:

$$r = g\frac{B}{A};$$

wherein A represents a first accuracy rate, B represents a second accuracy rate, a value of g is greater than or equal to 1; the first accuracy rate is an accuracy rate of a trained model obtained by the central server and the plurality of nodes based on a federated average learning algorithm; the second accuracy rate is an average of third accuracy rates respectively transmitted by the plurality of nodes; and the third accuracy rate is obtained during a model training process same as a model training process in which the first gradient is obtained by the plurality of nodes using the sample data to train the model to be trained in the plurality of nodes.

2. The method of claim 1, wherein the target Q value is a smallest Q value among Q values determined by a plurality of Critic networks.

3. The method of claim 1, wherein in response to a value of B/A being greater than 1, the value of g is greater than 1; in response to the value of B/A being smaller than or equal to 1, the value of g is equal to 1.

4. The method of claim 1, wherein the Actor-Critic network comprises three Critic networks;
    for each of the three Critic networks, a first Q value determined in the current gradient update process is based on a Q value gradient and a second Q value determined during the previous gradient update process;
    wherein the Q value gradient is determined based on a first parameter, and the first parameter satisfies following formula:

$$J = \mathbb{E}_{(s,a)\sim D}\frac{1}{2}[k(Q_{\theta_3}(s_t, a_t) - (r(s_t, a_t) + \gamma V_{\theta_3}(s_{t+1}, a_{t+1}))^2 + 1(Q_{\theta_i}(s_t, a_t) - (r(s_t, a_t) + \gamma V_{\theta_i}(s_{t+1}, a_{t+1}))^2];$$

$$V_{\theta_i}(s_{t+1}, a_{t+1}) = \mathbb{E}_{a\sim\pi_\phi}[(Q_{\theta_i}(s_t, a_t) - \alpha_t\ln_q(\pi_t(a_t|s_t))];$$

wherein J represents the first parameter; t represents a number of times of the current gradient update process; k>0, l>0, k+l=1; $\theta_1$, $\theta_2$, and $\theta_3$ respectively represent three Critic networks; $\theta_i$ represents a network corresponding to a minimum value among latest Q values determined by the three Critic networks respectively represented by $\theta_1$, $\theta_2$ and $\theta_3$; $s_t$ represents a state during a t-th gradient update process; $a_t$ represents a third probability of the plurality of nodes during the t-th gradient update process; $Q_{\theta_i}(s_t, a_t)$ represents a third Q value determined by the Critic network corresponding $\theta_i$ under $s_t$, $a_t$ condition during the t-th gradient update process; $Q_{\theta_3}(s_t, a_t)$ represents a Q value output by the Critic network corresponding $\theta_3$ under $s_t$, $a_t$ condition during the t-th gradient update process; $r(s_t, a_t)$ represents the reward value under $s_t$, $a_t$ condition during the t-th gradient update process; a value of γ is larger than 0; $\pi_t(a_t|s_t)$ represents a fourth probability of $a_t$ under $s_t$ condition; q represents an index of entropy; $\ln_q$ represents entropy; and a value of $\alpha_t$ is not equal to 0.

5. The method of claim 4, wherein α used in the current gradient update process is determined based on a α gradient and a α used in the previous gradient update process, and the α gradient satisfies following formula:

$$J(\alpha) = \mathbb{E}_{a \sim D, a \sim \pi_\phi}[-\alpha_{t-1}(\ln_q(\pi_t(a_t \mid s_t) + H)];$$

wherein, J(α) represents the α gradient, $\alpha_{t-1}$ represents the α used in the previous gradient update process, and H represents an ideal minimum expected entropy.

6. The method of claim 4, wherein the k and the l are determined based on a variance of the accuracy of the model before the gradient update processes in the plurality of nodes.

7. The method of claim 1, wherein the first probability of the node output by the Actor network in the current gradient update process is determined based on a probability gradient and the second probability of the node output in the previous gradient update process, and the probability gradient satisfies following formula:

$$J(\pi_\phi) = \mathbb{E}_{s(s,a) \sim D}[\alpha_t \ln_q(\pi_t(a_t \mid s_t) - (Q_{\theta_i}(s_t, a_t)];$$

wherein, $J(\pi_\phi)$ represents the probability gradient, t represents a number of the current gradient update process; $\theta_1$, $\theta_2$, and $\theta_3$ respectively represent three Critic networks; $\theta_i$ represents a network corresponding to a minimum value among latest Q values determined by the three Critic networks respectively represented by $\theta_1$, $\theta_2$ and $\theta_3$; $s_t$ represents a state during a t-th gradient update process; $a_t$ represents probability of the plurality of nodes during the t-th gradient update process; $Q_{\theta_i}(s_t, a_t)$ represents a Q value determined by the Critic network corresponding $\theta_i$ under $s_t$, $a_t$ condition during the t-th gradient update process; $\pi_t(a_t|s_t)$ represents probability of $a_t$ under $s_t$ condition; q represents an index of entropy; $\ln_q$ represents entropy; $\alpha_t$ represents α used in the current gradient update process, and a value of $\alpha_t$ is not equal to 0.

8. The method according to any one of claim 1, wherein the central server and the plurality of nodes perform gradient updates based on a federated learning architecture.

* * * * *